United States Patent [19]

Lyons

[11] 4,276,101
[45] Jun. 30, 1981

[54] BREATHABLE LEATHER-LIKE MATERIALS AND PROCESS FOR MAKING SAME

[75] Inventor: Harold D. Lyons, Spartanburg, S.C.

[73] Assignee: Milliken Research Corporation, Spartanburg, S.C.

[21] Appl. No.: 99,045

[22] Filed: Nov. 30, 1979

Related U.S. Application Data

[60] Continuation of Ser. No. 686,622, May 14, 1976, abandoned, which is a division of Ser. No. 389,023, Aug. 16, 1973, abandoned.

[51] Int. Cl.$^3$ .......................... B32B 31/06; B05D 5/02
[52] U.S. Cl. ........................................ 156/61; 156/230; 156/234; 156/238; 427/257; 427/280; 427/288; 427/375; 427/384.9; 428/91; 428/96; 428/151; 428/245; 428/288; 428/904
[58] Field of Search .................. 428/290, 317, 151, 96, 428/904, 90, 91, 245, 204, 288; 156/230, 61, 238, 234; 427/262, 267, 274, 288, 280, 257, 375, 384.9; 264/134, 137

[56] References Cited

U.S. PATENT DOCUMENTS

| | | | |
|---|---|---|---|
| 3,387,984 | 6/1968 | West et al. | 428/95 |
| 3,865,622 | 2/1975 | Blair | 428/151 |

*Primary Examiner*—Stanley S. Silverman
*Attorney, Agent, or Firm*—H. William Petry; Terry T. Moyer

[57] ABSTRACT

A leather-like material with a high degree of air permeability, good abrasion resistance and resistance to cracking at low temperatures comprising a porous fibrous substrate having fibers extending from a surface thereof, and a polymer layer secured substantially exclusively along said extending fibers and forming a discontinuous polymer phase and a continuous pore phase, said leather-like material having a surface luster of the same order of magnitude as top-grain leather.

11 Claims, 3 Drawing Figures

BREATHABLE LEATHER-LIKE MATERIALS AND PROCESS FOR MAKING SAME

This is a continuation of pending application Ser. No. 686,622, filed May 14, 1976, now abandoned, which is a division of U.S. Ser. No. 389,023, filed Aug. 16, 1973, now abandoned.

Through the years, many attempts have been made to produce leather-like materials. These attempts generally have involved the use of plastic or resinous materials with or without reinforcing substrates, such as textile fabrics. While many of the characteristics of leather have been successfully duplicated, e.g. appearance and hand, one of the principal deficiencies with such man-made materials is moisture transport. Man-made materials attempt to duplicate the moisture transport of leather by increasing the porosity or breathability of various means including the use of pore-forming agents, by punching holes through the coatings and the like. However, none of the products heretofore produced have achieved the combination of a high degree of breathability together with other desirable characteristics such as appearance and hand, and particularly, good resistance to abrasion and to stiffening and cracking at low temperatures, e.g. $-20°$ F., which permits use of the products under extreme weather conditions.

Breathable prior art materials having the smoothness and appearance of top-grain leather, in general, either have had good abrasion resistance or have had good resistance to cold cracking but have not possessed both of these qualities along with good breathability. Attempts to produce such a product ordinarily have required multiple coatings which, through improving either abrasion resistance or cold cracking, have adversely affected other properties and particularly have caused a substantial reduction in breathability. Hence, the known breathable leather-like materials are generally utilized where one main characteristic, i.e. abrasion resistance or resistance to cold cracking, is important and where minimal adverse effects due to the lack of the other characteristic can be tolerated.

Exemplary of the known prior art are U.S. Pat. Nos. 3,282,721 to Iseki; 3,387,989 to West et al.; 3,496,001 to Minobe et al.; 3,520,767 to Manwaring; and 3,529,049 to Abell et al. The prior art techniques have been directed primarily to the use of urethanes in solvent compositions with pore-forming agents dispersed therein. Solvent urethanes are applied to a fabric substrate such as a napped fabric and thereafter coagulated in situ, after which pores are formed to permit breathability of the substrate. Various vinyl plastisols, acrylics and the like also have been utilized to produce the porous materials.

The present invention provides a breathable material very similar to top-grain leather that is characterized by good resistance to abrasion and good resistance to appreciable stiffening or cracking at temperatures as low as $-20°$ F. Furthermore, the product also may be given after treatments such as water repellency, flameproofing, etc. without significantly reducing the above qualities.

The novel leather-like material of the present invention, having a high degree of air permeability, good abrasion resistance and resistance to cracking at low temperatures, comprises a porous fibrous substrate having fibers extending from a surface thereof and a polymer layer secured substantially exclusively along the extending fibers and forming a discontinuous polymer phase and a continuous pore phase. The leather-like material of the invention has a surface luster of the same order of magnitude as top-grain leather.

Substrates that are suitable for use according to the present invention include virtually any coherent fiber mass that has a plurality of fibers extending upwardly or outwardly therefrom to receive and hold the polymer coating. For example, the substrate may be a napped fabric that has been knitted or woven, a non-woven fabric, a batt, or the like. Furthermore, the fibers extending outwardly from the base of the substrate may be coated as is or may be sheared to achieve a particular fiber length or uniformity. Preferably, the fibers extend outwardly from the base about 20 to 45 mils, a length common with napped fabrics. Both natural and synthetic fibers may be utilized in production of a suitable substrate, the fiber selection being dependent upon the ultimate end use of the product. For example, natural fibers such as cotton, wool and the like may be utilized as well as synthetic fibers such as rayon, polyesters, polyamides, acrylics and the like or blends of natural and synthetic fibers. Obviously, to achieve a breathable final product, the substrate utilized must be breathable or permeable to the passage of air. Normally, substrates employed in practice of the present invention possess an air permeability in the range of about 10 to about 100 cubic feet per square foot per minute, although in very lightweight fabrics, such as napped knit fabrics, permeabilities have exceeded 300 cubic feet per square foot per minute. The air permeability is measured according to the procedure of ASTM-D737-69 using 0.5 inches water pressure.

Suitable polymers for use in the formation of the polymer layer of the present invention include those formed from vinyl monomers, e.g. vinyl chloride, vinylidene chloride, and vinyl acetate; alkenes, e.g. ethylene, propylene and the like; and acrylics, e.g. methyl acrylate, ethyl acrylate, acrylic acid, acrylonitrile, 2-ethylhexyl acrylate, butyl acrylate, methyl methacrylate, acrylamide, N-methylol acrylamide, hydroxyethyl acrylate, hydroxypropyl methacrylate, glycidyl acrylate, and the like. Polymer in the sense of the present application refers to homopolymers, copolymers interpolymers, and the like.

While various ethylenically unsaturated monomers may be employed to produce polymer systems for practice of the present invention, aqueous dispersions of acrylic polymers are preferred for the production of leather-like materials to be used in the manufacture of garments. One preferred polymer is produced by aqueous emulsion polymerization of a mixture of ethyl acrylate, acrylonitrile and acrylamide monomers. Thereafter, the resulting polymer may be utilized in an aqueous dispersion or may be further reacted with an aldehyde such as formaldehyde prior to formulating the aqueous dispersion.

Normally, the aqueous dispersion is made up of polymers, emulsifiers, pigments or dyes, thickeners, cross-linking agents for the polymers, catalysts, water, and the like. Other additives such as polyethylene dispersions may be included, though no pore-forming material per se is required, e.g. inert inorganic removable granules of the prior art. The composition is adjusted to achieve a viscosity in the range of about 5,000 to 100,000 centipoises and preferably in the range of from about 10,000 to 50,000 centipoises using a Brookfield Model RVF viscosimeter with a No. 4 spindle at 6 rpm. Air or another gas is advantageously entrapped in the composition to lower the density of the composition, preferably to a density from about 0.4 to about 0.9 grams per cubic centimeter.

The polymer composition advantageously is applied to the substrate by a transfer coating technique where the wet composition is first applied to a release medium after which the release medium with polymer thereon is brought into engagement with the substrate. Thereafter, the release medium-polymer-substrate combination is subjected to pressure to properly position the polymer along the outwardly extending fibers with substantially no polymer being embedded in the base of the substrate. Advantageously, at least about 80% of the polymer is disposed along the extending fibers.

The polymer network produced in the outwardly extending fibers has a relatively smooth upper surface, like a top-grain leather, and as mentioned above is made up of a continuous phase of pores or voids extending along the fibers with a discontinuous phase of polymer dispersed therethrough; that is, the polymer is secured around the fibers along a majority of the length thereof. Preferably, the polymer covers between about 30% and 70% of the substrate surface rather than forming a continuous film over the surface. While density, viscosity and placement of the polymer composition are important to permeability and resistance to cold cracking, also it is advantageous that the wet polymer layer be between about 5% and 15% of the thickness of the substrate or between about 2 and 10 mils. For example, with a 45-mil thick substrate, the wet polymer would have a wet layer about 5 mils in thickness which would dry down to about 2 mils. The polymer preferably is present in an amount between about 7% and 15% based on the weight of the substrate.

A product according to the present invention is illustrated by the photograph and photomicrographs of the Figures in which.

Figure 1:
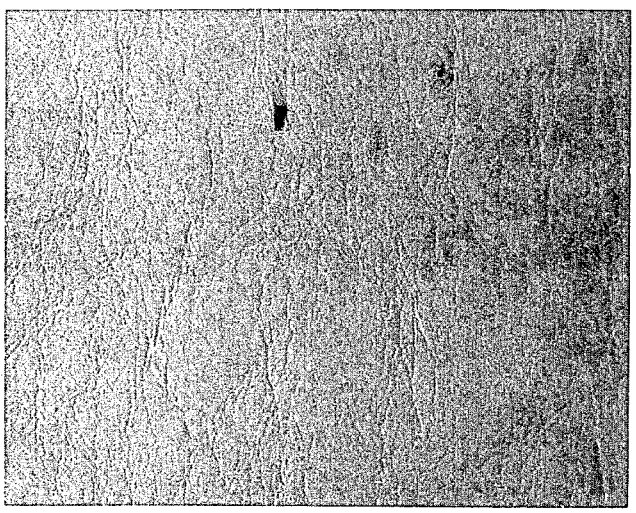
FIG. 1 is a photograph of a top view of a leather-like material produced according to the present invention without magnification.
Figure 2:
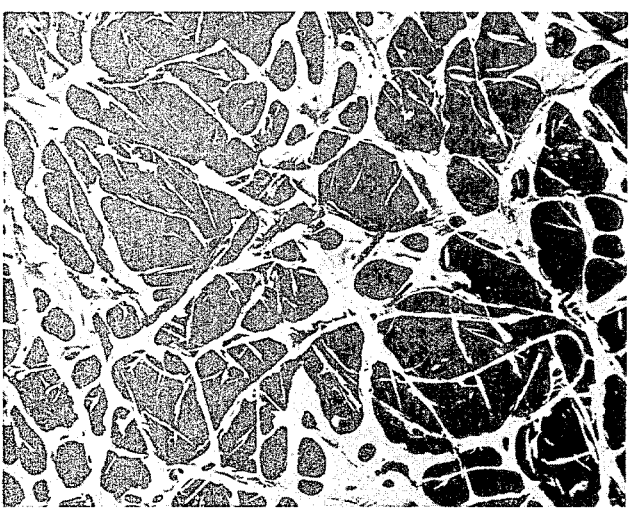
FIG. 2 is a photomicrograph at a magnificant of 50 times showing the top surface of a leather-like material produced according to the present invention.
Figure 3:
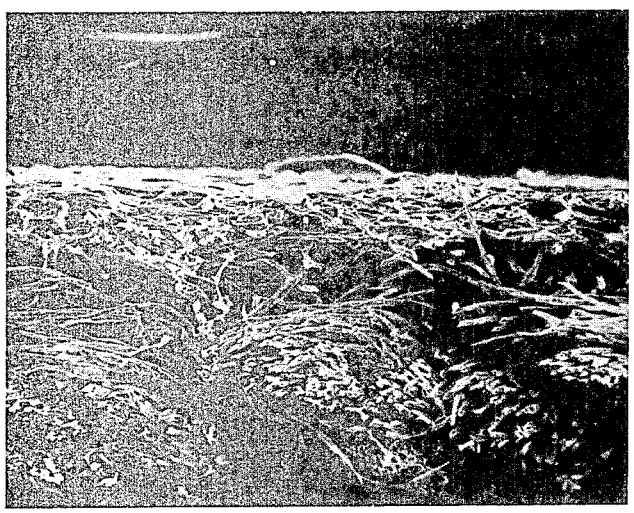
FIG. 3 is a photomicrograph at a magnification of 50 times showing a vertical cross section of a leather-like material as shown in FIG. 2.

As is apparent from FIG. 1, the product of the present invention has a generally smooth, grainy surface much like top-grain leather. Moreover, the gloss of the product is that of a top-grain leather and is significantly different from that of suede or imitation suede products. FIG. 2 shows the details of the product surface with the napped fibers surrounded by polymer forming discontinuous polymer islands. Irregularly shaped voids or pores surround the polymer islands as a continuous phase among the fibers. The size of the voids varies considerably and has been determined to range up to approximately 900 microns across the widest portions thereof in a single plane. In FIG. 3, a cross-sectional view of the material of FIG. 2, it may be seen that the majority of the polymer is located adjacent the upper end of the napped fibers, with the amount of polymers on the fibers diminishing toward the base of the substrate. Further, very little, if any, polymer is present in the base of the substrate and the very tips of at least some of the napped fibers protrude from the polymers network.

The unique combination of abrasion resistance, breathability and resistance to cold cracking enables the product of the invention to be employed in products for a variety of uses. For example, the product may be successfully employed in the manufacture of garments, shoe uppers, tents, automotive headliners, upholstery and paneling, domestic upholstery and drapes, and the like. It has been found that seats upholstered with products of the invention seem to be cooler to the touch than other leather-like upholstery materials.

With certain end uses, further treatment (such as with a water-repellent coating) may be desirable. Such aftertreatment may be accomplished without adversely affecting the desirable characteristics mentioned above since the subsequently applied chemicals tend to adhere to the discontinuous network of the previously applied polymer. Thus, properties imparted by the aftertreatment may be realized without significantly altering the geometry or performance of the polymer layer.

The following examples are intended to illustrate the invention.

EXAMPLE 1

A 50-gallon glass-lined reactor is charged with 203 pounds of water and heated to 160° F. During heating, a pre-emulsion mix is prepared in an addition tank comprising 42 pounds of water; 2.2 pounds of Triton X-200, a sodium alkylaryl polyether sulfonate manufactured by Rohm and Haas Company, Philadelphia, Pennsylvania; 7.3 pounds of Triton X-405, an alkylaryl polyether alcohol manufactured by Rohm and Haas Company; 92.3 pounds of butyl acrylate monomer; 17.0 pounds of acrylonitrile monomer; 5.7 pounds of acrylamide monomer and 160 grams of methacrylic acid monomer. Thereafter, an initiator solution comprising 17.2 pounds of water and 160 grams of ammonium persulfate is mixed and placed in a second addition tank. Once the water in the reactor reaches 160° F., 80 grams of sodium bisulfite, 1.7 pounds of Abex 18-S, an anionic surfactant manufactured by Alcolac Chemical Corporation, Baltimore, Md.; and 0.04 rams of hydrated ferrous sulfate are added to the reactor. The reactor is sealed and purged with nitrogen gas by pressurizing twice to 20 pounds per square inch gauge pressure (psig) and leaving a resulting 5 psig positive pressure. The initiator is added to the reactor over a period of 100 minutes while the pre-emulsion mix is added over a period of 130 minutes. After all of the pre-emulsion mix is added, the mixture is maintained at 160° F. for one hour and cooled to 120° F. A yield of 312 pounds at 32.6% solids is produced, having a pH of 4.1.

EXAMPLE 2

A pre-emulsion mix is prepared as in Example 1 from 30 pounds of water; 2.5 pounds of Triton X-200; 7.3 pounds of Triton X-405; 90 pounds of ethyl acrylate monomer; 17.0 pounds of acrylonitrile monomer; 5.7 pounds of acrylamide monomer as a solution in 12 pounds of water and 160 grams of methacrylic acid monomer. The glass-lined reactor is charged with 190 pounds of water and 11 pounds of ethyl acrylate monomer, followed by sealing of the reactor. The initiator solution of Example 1 is added and the reactor purged with nitrogen gas as in Example 1. Heating is continued for 90 minutes at 160° F. The reactor is then opened and 8 pounds of Surfonic N-150 (an alkylaryl polyoxyethylene ether surfactant produced by Jefferson Chemical Co., Houston, Tex.) in 16 pounds of water are added slowly along with 2 grams of hydroquinone. Thirty minutes later 216 pounds of product are removed from the reactor and stored. This product is identified as 2-A. Thereafter, 1.6 pounds of a 40% formaldehyde solution are added to the reactor followed by agitation for 30 minutes. One hundred sixty-four pounds of product identified as 2-B are recovered.

EXAMPLE 3

A pre-emulsion mix is prepared as in Example 1 from 44.4 pounds of water, 101 pounds of methyl acrylate monomer, 7.5 pounds of Abex 18-S, 0.4 pounds methacrylic acid monomer and 2.8 pounds acrylamide monomer. The glass-lined reactor is charged with 203 pounds of water, 1.8 pounds of Abex 18-S, 11 pounds of methyl acrylate monomer and 0.2 pounds of sodium bisulfite. The initiator solution of Example 1 is added and the reactor purged with nitrogen gas as in Example 1. The pre-emulsion mix and initiator solution are added to the reactor over a period of 1.5 hours after which the mixture is held at 175° F. for another 1.5 hours. After cooling, a solution of 7.5 pounds of Surfonic N-150 in 20.0 pounds of water is added.

Polymers such as those produced in Examples 1 and 2 are used to prepare polymer coating formulations of the present invention according to the following procedure.

EXAMPLE 4

One hundred parts of the polymer of Example 2 (Product 2-A) is mixed with 8 parts of Emersoft 7777, a nonionic, non-nitrogeneous softener produced by Emery Industries, Cincinnati, Ohio; 5 parts Kemsperse Brown RFS, 0.2 part Kemsperse Black, pigments made by Sherwin Williams Co., Cleveland, Ohio; 5 parts of Rohm and Haas Curing Agent RK-8, a combination catalyst and crosslinking agent manufactured by Rohm and Haas Company and 25 parts of a 7½% solution of Acrysol ASE-60, an acrylic acid polymer manufactured by Rohm and Haas Company. The mixture is then thickened to 14,000 centipoises. Brookfield RVF viscosity measured with a No. 4 spindle at 6 rpm, after which it is blended with air to yield a polymer density of 0.7 to 0.8 grams per cubic centimeter.

The resulting polymer composition is applied to fabric by the procedure of the following Example.

EXAMPLE 5

The polymer composition produced in Example 4 is applied to a treated release paper at a wet thickness of approximately 5 mils after which an unsheared, napped cotton fabric 45-mils thick is brought into contact with the polymer composition. The substrate-polymer-release paper composite is then passed through a pair of nip rolls operating at a modern pressure. Subsequent to passing through the nip, the composite is dried at a temperature of 360° F. and the release paper then stripped therefrom. The polymer is cured by subjecting the composite to a temperature of 360° F. for two minutes after which the product is moistened and tumble dried. A leather-like product is produced having a smooth, grainy surface much like the appearance of natural top-grain leather.

The product is tested for air permeability at 0.5 inches water pressure according to the method of ASTM-D737-69. Results indicate about 17 cubic feet per square foot per minute air passage. Stoll flat abrasion resistance is also checked according to the procedure of ASTM-D1175-71 using a one-pound lead weight. Results indicate about 2,600 cycles before the polymer coating wears through. Furthermore, no cracking or appreciable stiffening of a sample is noticed when bent 180°, created at a temperature of −20° F. and then straightened. Drape and handle of the product are also quite acceptable for a garment end-use.

EXAMPLES 6-11

Polymer formulations are prepared according to the procedure of Example 4 using an acrylic polymer sold by Rohm and Haas Company as Rhoplex E-358. Formulation densities for the separate examples are listed in Table I. These individual polymer formulations are transfer paper coated onto napped cotton according to the method of Example 5 and the products produced are analyzed for air permeability. Stoll flat abrasion resistance and resistance to cold cracking as described in Example 4. Samples 6-9 do not crack at −20° F. Results are tabulated in Table I and compared with an uncoated control.

In Table I, column A is the density of the polymer composition in grams per cubic centimeter. Column B is the air permeability in cubic feet per square foot per minute. Column C is the porosity in percent of the original porosity. Column D is the Stoll flat abrasion resistance in cycles required to wear through the coating.

TABLE I

| EXAMPLE NO. | (A) | (B) | (C) | (D) |
|---|---|---|---|---|
| control | — | 30.20 | — | — |
| 6 | 0.35 | 28.80 | 95.0 | 2000 |
| 7 | 0.42 | 24.96 | 83.0 | 2241 |
| 8 | 0.63 | 27.06 | 90.0 | 4365 |
| 9 | 0.77 | 22.44 | 74.0 | 6000 |
| 10 | 0.80 | 16.75 | 55.5 | 2601 |
| 11 | 1.00* | 7.45 | 25.0 | 2573 |

*No air is blended with the polymer.

The data set forth in Table I illustrates the unique properties of products produced according to the present invention. Note, for example, that polymer composition densities in the range of 0.42 to 0.80 g/cc produce a product that has 55% to 90% of the porosity of the uncoated control. A Stoll flat abrasion resistance in the range of 2,000 to 6,000 cycles to wear through is also shown.

EXAMPLE 12

Using an emulsion polymer as produced in Example 2, (Product 2-B) a polymer formulation is produced as described in Example 4. Thereafter, a coated fabric is produced according to Example 5 having a smooth, leather-like appearance and having equivalent properties to fabrics of Examples 7-10 in cold cracking and permeability. Furthermore, Stoll flat abrasion resistance increases to 20,000 cycles before wearing through of the polymer layer.

EXAMPLES 13-17

Samples of the products produced according to Examples 6-9 and 11 are also analyzed to determine the degree of polymer coverage on the surface of the product. Scanning electron micrographs of the samples are produced using a model Mark I Scanning Electron microscope manufacture by Cambridge Scientifiic Instruments, Ltd., Cambridge, England. The samples are metal coated according to conventional techniques and are positioned flat with little or no angle with respect to the lens system. Such photography produces a detailed surface image with little detail below the surface due to action of the electron beams. The photographs are then analyzed by three persons utilizing an electronic planimeter, a Graficolor, Model 903, manufactured by Spatial Data Systems Inc., Galeta, Calif. to measure the surface coverage. Thereafter, the individual planimeter readings are averaged. Results are tabulated in Table II below.

In Table II, column A is the density of the polymer foam in grams per cubic centimeter. Column B is the porosity in percent of the original porosity. Column C is the average percentage of the surface covered by polymer.

TABLE II

| EXAMPLE NO. | (A) | (B) | (C) |
|---|---|---|---|
| 13 | 0.35 | 95 | 57.2 |
| 14 | 0.42 | 83 | 59.0 |
| 15 | 0.63 | 90 | 69.4 |
| 16 | 0.77 | 74 | 68.1 |
| 17 | 1.00* | 25 | 75.0 |

*No air is blended with the polymer.

With the exception of Example 15 where 90% of original porosity was found, the remainder of the Examples show less porosity for greater surface coverage. With more than 50% of the surface covered, the product retains 95% of the original porosity of the untreated napped cotton fabric base.

EXAMPLES 18–22

Examples 6–11 are repeated and the product are analyzed for air permeability, abrasion resistance and resistance to cold cracking. None of the products crack at −20° F. Results are tabulated in Table III.

In Table III, column A is the density of the polymer compositiion in grams per cubic centimeter. Column B is the viscosity of the polymer composition in centipoises. Column C is the air permeability in cubic feet per square foot per minute. Column D is the Stoll flat abrasion resistance in cycles required to wear through the coating.

TABLE III

| EXAMPLE NO. | (A) | (B) | (C) | (D) |
|---|---|---|---|---|
| control | — | — | 34.5 | — |
| 18 | 0.32 | 21,500 | 29.9 | 533 |
| 19 | 0.45 | 24,000 | 27.5 | 834 |
| 20 | 0.59 | 29,000 | 30.3 | 701 |
| 21 | 0.74 | 27,000 | 25.3 | 1001 |
| 22 | 1.00* | 18,500 | 21.8 | 1336 |

*No air is blended with the polymer.

EXAMPLES 23–26

Leather-like products are produced according to Example 5, with variations as tabulated in Table IV. None of the products crack at −20° F. Results are tabulated in Table IV.

In Table IV, column A is the wet thickness of the polymer coating in mils. Column B is the density of the polymer composition in grams per cubic centimeter. Column C is the viscosity of the polymer composition in centipoises.

TABLE IV

| EXAMPLE NO. | (A) | (B) | (C) |
|---|---|---|---|
| 23 | 1.5 | 0.61 | 7000 |
| 24 | 5.0 | 0.61 | 7000 |
| 25 | 5.0 | 0.62 | 5000 |
| 26 | 5.0 | 0.92 | 63000 |

EXAMPLE 27

One hundred parts of the polymer of Example 2 (Product 2A) is mixed with 0.4 parts of concentrated ammonium hydroxide; 0.1 part of NOPCO 267A textile defoamer made by Nopco Chemical Co., Newark, N.J.; 11.4 parts Protolube HD, a high density polyethylene dispersion made by Proctor Chemical Co., Salisbury, North Carolina; 5 parts Kemsperes Brown RFS, 0.2 part Kemsperes Black, pigments made by Sherwin Williams Co., Cleveland, Ohio; and 10 parts water. This mixture is screened through a 325 mesh sieve to insure the absence of small lumps and is subsequently thickened by the addition of 0.6 part Natrosol 250 HHXR, an ethoxylated cellulosic product of Hercules Inc., Wilmington, Del., in 3 parts water. Immediately prior to use, 7.4 parts of Curing Agent RK-8 is added and the composition is reduced in density from 1.09 to 0.96 grams per cubic centimeter by blending with air. The resulting polymer composition is applied to fabric according to the procedure of Example 5 and the following results are indicated. Air permeability is about 28 cubic feet per square foot per minute. A Stoll flat abrasion resistance of 7,928 cycles is registered before the polymer coating wears through. There is no evidence of cold cracking at −20° F. A sample of the product is shown in FIG. 1 of the drawings.

EXAMPLE 28

One hundred parts of a 50/50 blend of Rhoplex E-801 made by Rohm and Haas Company and the polymer of Example 3 are mixed with 0.8 part concentrated ammonium hydroxide; 7 parts Kemsperse Black KS; 7.7 parts Protolube HD; 7 parts of a 33% aqueous dispersion of Hydral 710, a hydrated alumina made by the Aluminum Company of America, Pittsburgh, Pa.; and 0.2 part NOPCO 267A. After screening the mixture through a 325 mesh sieve, a slurry of 0.7 part Natrosol 250 HHXR in 3.5 parts water is added with stirring to thicken to 25,000 centipoise Brookfield Model RVF viscosity as measured with a No. 4 spindle at 6 rpm. The density of this composition is reduced from 1.09 to 0.95 by blending with air.

The above polymer formulation is transfer coated onto napped cotton according to the method of Example 5 and the samples are moistened and tumbled to produce a leather-like upholstery fabric. Results indicate an air passage of about 21 cubic feet per square foot per minute. The product does not crack at −20° F. A Stoll flat abrasion resistance of about 3.002 cycles to wear through is also shown.

Tests performed with automobile seats upholstered with the fabrics of Example 28 reveal that these fabrics have a cooler feel than conventional vinyl automobile seats. The following Examples report test procedures and results of temperature measurement under various conditions.

EXAMPLE 29

Samples of leather, polyurethane, vinyl, a napped textile fabric and the coated fabric of Example 28 are mounted on rolls of paper towels about 5½ inches in diameter and 12 inches in length with each fabric sample being sewn into a tube and slipped over the paper towel roll. These specimens are placed inside an automobile under the rear window. After 60 minutes, the temperatures of the samples are measured and it is found that the leather has a temperature of 171° F., the polyurethane 160° F., the vinyl 170° F., the napped fabric 168° F. and the fabric of Example 28, 135° F.

EXAMPLE 30

The cooling effect of the respective materials is measured in a laboratory by heating the specimens of Example 29 for one minute with an infrared lamp in an OHAUS Moisture Determination Balance Model 6010 at a setting of 5 with the specimens spaced 4¼ inches from the lamp face. After one minute, the specimens are removed from below the lamp and allowed to cool in a room at 75° F. to determine the period of time necessary to cool to approximately body temperature (100° F.). Although it would be expected that the rate of cooling would be faster for the samples which attained the highest temperatures in heating due to the temperature differential with the room temperature, it is found that the leather sample takes 3 minutes to cool from the attained temperature of 148° F. to 100° F., the polyurethane 3 minutes 30 seconds from 170° F. to 100° F. and the vinyl 4 minutes 30 seconds to cool from 175° F. to 100° F. The napped fabric and the coated fabric of Example 26 cooled down 140° F. and 135° F. respectively to 100° F. in only 2 minutes 30 seconds. Thus, the coated fabric of the invention is as cool as the uncoated fabric after the 1-minute heating period and cools as rapidly to 100° F. and both of these specimens cool in a substantially shorter period than is required for other man-made leather-like materials, namely polyurethane and vinyl.

EXAMPLES 31–35

Other polymers compositions are prepared and applied to a napped fabric substrate according to the procedure of Example 3. The composition comprises 400 grams of each polymer latex, 150 grams of water, 1 gram of an antifoaming agent, 30 grams of pigments and 2 to 6 grams of thickener to adjust composition viscosity to the range of 12,000 to 16,000 cps. Leather-like products are evaluated and the results tabulated in Table V. No. cracking of the samples occurs at −20° F.

In Table V, column A is the polymer latex employed. Column B is the density of the polymer composition in grams per cubic centimeter. Column C is the air permeability in cubic feet per square foot per minute. Column D is the Stoll flat abrasion resistance in cycles required to wear through the coating.

TABLE V

| EXAMPLE NO. | (A) | (B) | (C) | (D) |
| --- | --- | --- | --- | --- |
| control | Uncoated | — | 34.5 | — |
| 31 | Geon 576 | 0.78 | 29.6 | 2,000 |
| 32 | Geon 652 | 0.75 | 33.2 | 1,950 |
| 33 | 80% Polyco 2114 20% Polyco 2134 | 0.74 | 28.2 | 1,500 |
| 34 | 21% Polyco 2114 79% Polyco 2134 | 0.76 | 27.7 | 2,151 |
| 35 | 21% Polyco 2134 | 0.80 | 28.2 | 800 |

TABLE V-continued

| EXAMPLE NO. | (A) | (B) | (C) | (D) |
| --- | --- | --- | --- | --- |
| | 79% HC-1201 | | | |

Geon 576 is a dioctylphthalate plasticized polyvinyl chloride manufactured by B. F. Goodrich Chemical Company, Akron Ohio.
Geon 652 is a vinyl chloride/vinylidene chloride copolymer manufactured by B. F. Goodrich Chemical Company.
Polyco 2114 is a vinyl acetate/acrylic copolymer manufactured by Borden, Inc.
Polyco 2134 is a vinyl acetate/homopolymers manufactured by Borden, Inc.
HC-1201 is a polyurethane manufactured by Minnesota Mining and Manufacturing Company, Minneapolis, Minn.

EXAMPLE 36

The surface gloss of products made according to the procedures of the preceding Examples are measured according to the procedure of ASTM-D2457-70. The results for these products vary from about −0.7 to +5.7. A number of top-grain leather samples measures between −0.3 and +2.6. In contrast to these results, natural and synthetic suede materials measure from −1.5 to −0.8. From the above results, it will be seen that the leather-like materials of the present invention have a gloss within the range of top-grain leather and also may be produced with a higher degree of gloss. Further, the leather-like materials of the invention have a gloss in a range completely outside that of suede materials.

The above description and Examples show that the present invention provides novel leather-like materials having a high degree of air permeability. Furthermore, the products of the invention have good abrasion resistance and good resistance to excessive stiffening and cold cracking at low temperatures. Moreover, the leather-like materials of the invention have an appearance and had similar to top-grain leather. In addition, the products of the invention absorb less heat than other man-made materials, such as vinyls and polyurethane. Also, the products can be aftertreated to impart other properties without adversely affecting the characteristics thereof.

It will be apparent that various modifications may be made in the procedures described above without departing from the scope of the invention. For example, coatings may be applied to more than one face of the substrate and various embossing or printing techniques may be utilized. Therefore, the invention is to be limited only by the following claims.

That which is claimed is:

1. A process for producing a leather-like material having a high degree of air permeability, good abrasion resistance and resistance to cracking at low temperatures, which comprises the steps of:
   (a) applying an aqueous polymer dispersion to a release medium, said dispersion having a gas entrapped therein to reduce the density of the dispersion to from about 0.4 to about 0.9 grams per cubic centimeter;
   (b) bringing said polymer dispersion on said release medium into engagement with a porous, fibrous substrate having a plurality of fibers extending outwardly therefrom to receive and hold said polymer dispersion to form a release medium-polymer-substrate combination;
   (c) subjecting said release medium-polymer-substrate combination to pressure to transfer said polymer dispersion to the fibers of said substrate whereby at least about 80 percent of said polymer is positioned along said outwardly extending fibers forming a polymer network wherein the tips of at least some of the fibers protrude from said polymer network with substantially no polymer being embedded in the base of said substrate, and wherein the polymer forms a discontinuous polymer phase which covers from about 30 percent to about 70 percent of the surface of said substrate with the remainder being a continuous pore phase; and (d) drying said polymer-treated substrate to form a leather-like material having a surface luster of from about −0.7 to about +5.7.

2. A process according to claim 1 wherein said polymer is cross-linked after being applied to said substrate.

3. A process according to claim 1 wherein said polymer dispersion has a viscosity between about 10,000 and 50,000 centipoises.

4. A process according to claim 1 wherein said polymer dispersion applied to the fibers extending from said substrate forms a wet layer between about 5% and 15% of the thickness of said substrate.

5. A process according to claim 1 wherein said polymer dispersion applied to the fibers extending from said substrate forms a layer between about 2 and 10 mils wet thickness.

6. A process according to claim 1 wherein said polymer dispersion is an acrylic polymer dispersion.

7. A process according to claim 6 wherein said acrylic polymer is formed by polymerization of a mixture comprising acrylonitrile and ethyl acrylate.

8. A process according to claim 1 wherein said polymer dispersion is an N-methylolated polymer dispersioon including polyethylene.

9. A process according to claim 1 wherein said pressure is created by roller pressure between about 10 and 1,000 pounds per linear inch.

10. A process according to claim 1 wherein the transfer sheet is removed after drying.

11. A process according to claim 1 wherein the polymer-treated substrate is dried at an elevated temperature and the polymer is crosslinked at a temperature above about 250° F.

* * * * *

UNITED STATES PATENT AND TRADEMARK OFFICE
CERTIFICATE OF CORRECTION

PATENT NO. : 4,276,101

DATED : June 30, 1981

INVENTOR(S) : Harold D. Lyons

It is certified that error appears in the above-identified patent and that said Letters Patent is hereby corrected as shown below:

Column 1, line 18, change "of" to --by--.

Column 3, line 42, change "magnificant" to --magnification--.

Column 7, line 24, change under column (C) "75.0" to --75.8--.

Column 8, line 18, change "Kemsperes" to --Kemsperse--.

Column 8, line 19, change "Kemsperes" to --Kemsperse--.

Column 8, line 25, change "Del." to --Delaware--.

Column 9, line 33, change "26" to --28--.

Column 9, line 34, change "down" to --from--.

Column 9, line 43, change "polymers" to --polymer--.

Column 9, line 45, change "3" to --5--.

Column 9, line 47, change "pigments" to --pigment--.

UNITED STATES PATENT AND TRADEMARK OFFICE
CERTIFICATE OF CORRECTION

PATENT NO. : 4,276,101

DATED : June 30, 1981

INVENTOR(S) : Harold D. Lyons

It is certified that error appears in the above-identified patent and that said Letters Patent is hereby corrected as shown below:

Column 9, line 52, change "No." to --No--.

Column 10, in Table V-continued, line 11, change "acetate/homopolymers" to --acetate/homopolymer--.

Column 10, line 20, change "measures" to --measure--.

Column 10, line 36, change "had" to --hand--.

Signed and Sealed this

Nineteenth Day of July 1983

[SEAL]

Attest:

GERALD J. MOSSINGHOFF

Attesting Officer

Commissioner of Patents and Trademarks